United States Patent
Hirao

(10) Patent No.: US 10,354,797 B2
(45) Date of Patent: Jul. 16, 2019

(54) CERAMIC ELECTRONIC COMPONENT AND METHOD FOR PRODUCING SAME

(71) Applicant: MURATA MANUFACTURING CO., LTD., Kyoto-fu (JP)

(72) Inventor: Takahiro Hirao, Kyoto-fu (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 361 days.

(21) Appl. No.: 14/822,620

(22) Filed: Aug. 10, 2015

(65) Prior Publication Data

US 2015/0348713 A1   Dec. 3, 2015

Related U.S. Application Data

(63) Continuation of application No. PCT/JP2014/052101, filed on Jan. 30, 2014.

(30) Foreign Application Priority Data

Feb. 14, 2013  (JP) ................................ 2013-026364

(51) Int. Cl.
  *H01G 4/30*  (2006.01)
  *H01G 4/002*  (2006.01)
  (Continued)

(52) U.S. Cl.
  CPC .............. *H01G 4/12* (2013.01); *H01G 4/012* (2013.01); *H01G 4/232* (2013.01); *H01G 4/30* (2013.01)

(58) Field of Classification Search
  CPC ............ H01G 4/30; H01G 4/12; H01G 4/012; H01G 4/002; H01G 4/005; H01G 4/232
  (Continued)

(56) References Cited

U.S. PATENT DOCUMENTS

| 2003/0107867 A1* | 6/2003 | Iwase ..................... H01G 4/30 361/301.4 |
| 2004/0042156 A1* | 3/2004 | Devoe .................... H01G 4/228 361/321.2 |
| 2008/0026136 A1* | 1/2008 | Skamser ............. C04B 35/4682 427/79 |

FOREIGN PATENT DOCUMENTS

| JP | S61-027327 U | 2/1986 |
| JP | H08-111344 A | 4/1996 |

(Continued)

OTHER PUBLICATIONS

Written Opinion of the International Searching Authority, PCT/JP2014/052101, dated Feb. 25, 2014.

(Continued)

*Primary Examiner* — Eric W Thomas
*Assistant Examiner* — Arun Ramaswamy
(74) *Attorney, Agent, or Firm* — Studebaker & Brackett PC

(57) ABSTRACT

A ceramic electronic component which is easily downsized, has reduced difficulty in handling, and is hardly chipped in a chip; and a method for producing the ceramic electronic component. The method includes the steps of: forming an uncured ceramic pattern which forms a ceramic layer after firing and has a circular plane shape by applying a ceramic slurry, which contains a ceramic material, to a predetermined location one time or a plurality of times repeatedly using a non-contact-type printing device such as an ink-jet printer; and forming uncured internal electrode patterns which form internal electrodes after firing and each have a circular plane shape by applying an electrode paste, which contains an internal electrode material, to a predetermined location one time or a plurality of times repeatedly using an ink-jet printer.

17 Claims, 15 Drawing Sheets

(51) Int. Cl.
    *H01G 4/005*     (2006.01)
    *H01G 4/232*     (2006.01)
    *H01G 4/012*     (2006.01)
    *H01G 4/12*     (2006.01)

(58) Field of Classification Search
    USPC ........ 361/321.2, 301.4, 303, 306.1; 29/25.42
    See application file for complete search history.

(56) References Cited

FOREIGN PATENT DOCUMENTS

| | | |
|---|---|---|
| JP | H09-232174 A | 9/1997 |
| JP | 2000-164451 A | 6/2000 |
| JP | 2002-100543 A | 4/2002 |
| JP | 2009-283627 A | 12/2009 |

OTHER PUBLICATIONS

International Search Report, PCT/JP2014/052101, dated Feb. 25, 2014.

\* cited by examiner

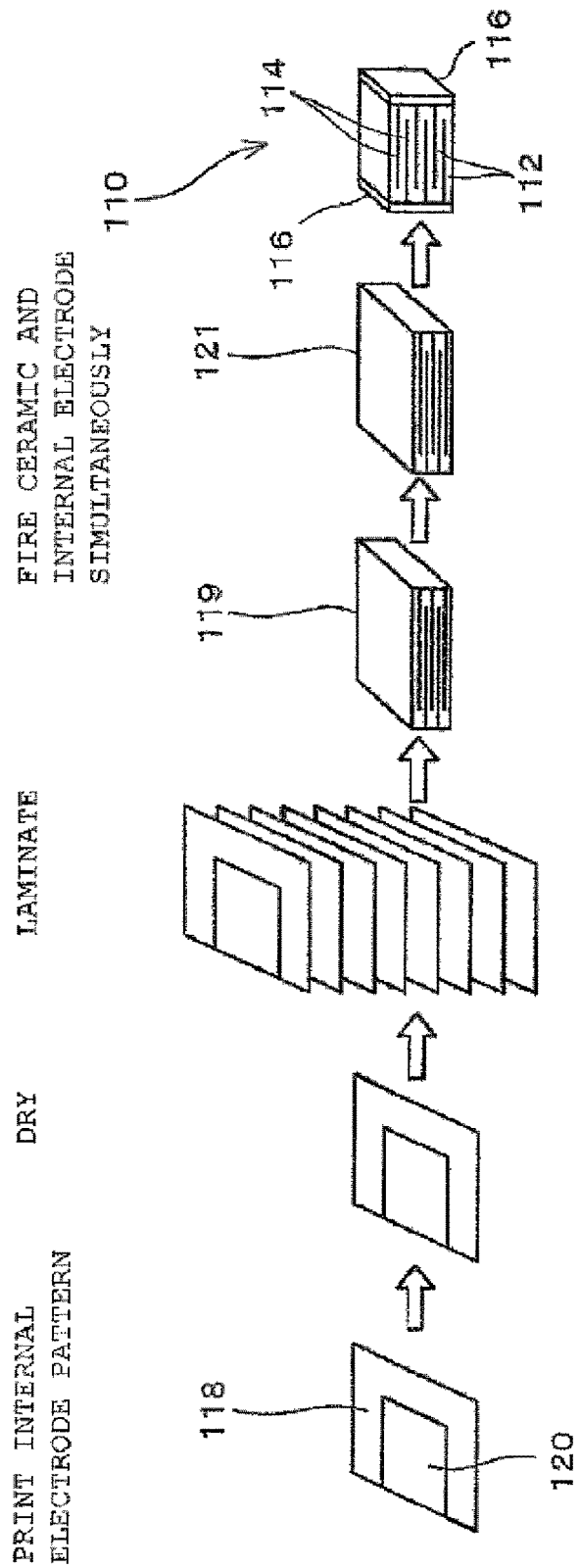

CERAMIC ELECTRONIC COMPONENT AND METHOD FOR PRODUCING SAME

CROSS REFERENCE TO RELATED APPLICATIONS

This application claims benefit of priority to Japanese Patent Application No. 2013-026364 filed Feb. 14, 2013, and to International Patent Application PCT/JP2014/052101 filed Jan. 30, 2014, the entire content of each of which is incorporated herein by reference.

TECHNICAL FIELD

The present disclosure relates to a ceramic electronic component and a method for producing the ceramic electronic component, and particularly to a ceramic electronic component including a region in which ceramic layers and internal electrodes are laminated alternately, and a method for producing the ceramic electronic component.

BACKGROUND

For example, multilayer ceramic electronic components such as multilayer ceramic capacitors and multilayer piezoelectric elements include a structural region in which ceramic layers and internal electrodes are laminated alternately.

As a method for producing such a multilayer ceramic electronic component, a method as described in Japanese Patent Laid-open Publication No. 2009-283627 has been proposed.

The method for producing a multilayer ceramic electronic component in Japanese Patent Laid-open Publication No. 2009-283627 will be briefly described below. According to this method, first a conductive ink is applied on a green sheet 118 intended to generate a ceramic fired body by an ink-jet printer to form an electrode coating film 120 as shown in FIG. 26.

Subsequently, the electrode coating film 120 is dried, a predetermined number of green sheets 118 each provided with the electrode coating film 120 made of the conductive ink are laminated, and an unfired ceramic laminated body 119 thus obtained is fired in a neutral or reducing atmosphere at 500 to 1400° C. In this way, a ceramic element 121 is obtained which has a structure in which internal electrodes 114 are laminated with a ceramic dielectric layer 112 interposed therebetween.

Thereafter, an external electrode 116 is formed on the ceramic element. In this way, a multilayer ceramic electronic component (multilayer ceramic capacitor) 110 is obtained.

However, the above-mentioned conventional method for producing a multilayer ceramic electronic component has the following problems.

(1) Downsizing is difficult. That is, there is a limit in processing on preparation of a chip-sized green sheet, and it is difficult to reduce the size to a length of 0.4 mm or less and a width of 0.2 mm or less.

(2) Handling is difficult. For handling a chip having a small size (length of 0.4 mm or less and width of 0.2 mm or less) as described in (1), a precise handling mechanism may be required, leading to an increase in equipment cost and a reduction in productivity.

(3) The chip has a corner portion, and is therefore easily chipped. Therefore, the defect ratio may be increased.

SUMMARY

Problem to be Solved by the Disclosure

The present disclosure solves the above-mentioned problems, and an object of the present disclosure is to provide a ceramic electronic component which is easily downsized, has reduced difficulty in handling, and is hardly chipped in a chip, and a method for producing the ceramic electronic component.

Means for Solving the Problem

For solving the above-mentioned problems, a method for producing a ceramic electronic component according to the present disclosure is a method for producing a ceramic electronic component which has a structure in which a first internal electrode and a second internal electrode each having a circular plane shape are arranged so as to face each other with a ceramic layer interposed therebetween, the ceramic layer having a circular plane shape; and the first internal electrode has a predetermined peripheral edge portion extending to a first region which is a predetermined region of a peripheral edge portion of the ceramic layer, the second internal electrode has a predetermined peripheral edge portion extending to a second region which is a predetermined region of a peripheral edge portion of the ceramic layer and which is different from the first region, the ceramic electronic component includes a first external electrode which is in conduction with the first internal electrode at the portion of the first internal electrode which extends to the first region, and the ceramic electronic component includes a second external electrode which is in conduction with the second internal electrode at the portion of the second internal electrode which extends to the second region, the method including the steps of:

forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed; and forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed.

In the present disclosure, the circular shape mentioned in the "ceramic layer having a circular plane shape" and the "internal electrode having a circular plane shape" is not limited to a literally completely circular shape, and conceptually includes a circular shape close to a complete circle.

Another method for producing a ceramic electronic component according to the present disclosure is a method for producing a ceramic electronic component which has a structure in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape; and the elliptical first internal electrode has one side end extending to a first region which is one side end of the elliptical ceramic layer, the elliptical second internal electrode has one side end extending to a second region which is the other side end of the elliptical ceramic layer, the ceramic electronic component includes a first external electrode which is in conduction with the first internal electrode at the portion of the first internal electrode which extends to the first region, and the ceramic electronic component includes a second external electrode which is in conduction with the second internal electrode at the portion of the second internal electrode which extends to the second region, the method including the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at the locations being connected to one another; and forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the locations being connected to one another.

A method for producing a ceramic electronic component according to the present disclosure is a method for producing a ceramic electronic component including a laminated body which has a structure in which a first internal electrode and a second internal electrode each having a circular plane shape are arranged so as to face each other with a ceramic layer interposed therebetween, the ceramic layer having a circular plane shape; and the first internal electrode is extended to the outside through a first via hole conductor arranged in the laminated body, and the second internal electrode is extended to the outside through a second via hole conductor arranged in the laminated body, the method including the steps of:

forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed;

forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed;

forming in the laminated body a first via hole extending to the first internal electrode and a second via hole extending to the second internal electrode; and filling the first via hole and the second via hole with a conductor.

A method for producing a ceramic electronic component according to the present disclosure is a method for producing a ceramic electronic component including a laminated body which has a structure in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape; and the first internal electrode is extended to the outside through a first via hole conductor arranged in the laminated body, and the second internal electrode is extended to the outside through a second via hole conductor arranged in the laminated body, the method including the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at the locations being connected to one another;

forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the locations being connected to one another;

forming in the laminated body a first via hole extending to the first internal electrode and a second via hole extending to the second internal electrode; and filling the first via hole and the second via hole with a conductor.

A method for producing a ceramic electronic component according to the present disclosure is a method for producing a ceramic electronic component which has a configuration in which a first internal electrode and a second internal electrode each having a circular plane shape are arranged so as to face each other with a ceramic layer interposed therebetween, the ceramic layer having a circular plane shape; and the first internal electrode has a predetermined peripheral edge portion extending to a first region which is a predetermined region of a peripheral edge portion of the ceramic layer, the second internal electrode has a predetermined peripheral edge portion extending to a second region which is a predetermined region of a peripheral edge portion of the ceramic layer and which is different from the first region, the portion of the first internal electrode which extends to the first region is exposed, and the exposed portion of the first internal electrode serves as a first external electrode, and the portion of the second internal electrode which extends to the second region is exposed, and the exposed portion of the second internal electrode serves as a second external electrode, the method including the steps of:

forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed; and forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed.

A method for producing a ceramic electronic component according to the present disclosure is a method for producing a ceramic electronic component which has a configuration in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape; and the elliptical first internal electrode has one side end extending to a first region which is one side end of the elliptical ceramic layer, the elliptical second internal electrode has one side end extending to a second region which is the other side end of the elliptical ceramic layer, the portion of the first internal electrode which extends to the first region is exposed, and the exposed portion of the first internal electrode serves as a first external electrode, and the portion of the second internal electrode which extends to the second region is exposed, and the exposed portion of the second internal electrode serves as a second external electrode, the method including the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at the locations being connected to one another; and forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the locations being connected to one another.

Preferably, the method for producing a ceramic electronic component according to the present disclosure includes a step of forming an unfired floating internal electrode pattern which forms a floating internal electrode that is not in conduction with the outside after firing.

Each of the printing devices which applies the ceramic slurry in such a manner that a discharge portion for discharging the ceramic slurry does not come into contact with an object to be printed and the printing device which applies the electrode paste in such a manner that a discharge portion for discharging the electrode paste does not come into contact with an object to be printed is preferably an ink-jet printer.

When an ink-jet printer is used as a printing device, an unfired ceramic pattern and an unfired internal electrode pattern with high shape accuracy can be efficiently formed, so that the present disclosure can be made more effective.

In the present disclosure, besides ink-jet printers, microdispensers capable of feeding a very small amount of ink, such as nozzle dispensers can also be used as non-contact-type printing devices, and other printing devices can be used as long as the effect of the present disclosure is not impaired.

In the method for producing a ceramic electronic component according to the present disclosure, the ceramic electronic component is preferably a layered ceramic electronic component in which a plurality of regions with the first internal electrode and the second internal electrode arranged so as to at least partially face each other with the ceramic layer interposed therebetween exist in the lamination direction.

The present disclosure is particularly useful when a layered ceramic electronic component is produced in which a plurality of regions with the first internal electrode and the second internal electrode arranged so as to at least partially face each other with the ceramic layer interposed therebetween exist in the lamination direction, and there can be provided a small-sized high-performance ceramic electronic component having the thinned ceramic layer and internal electrode.

A ceramic electronic component according to the present disclosure has a structure in which a first internal electrode and a second internal electrode each having a circular plane shape are arranged so as to face each other with a ceramic layer interposed therebetween, the ceramic layer having a circular plane shape; and the first internal electrode has a predetermined peripheral edge portion extending to a first region which is a predetermined region of a peripheral edge portion of the ceramic layer, the second internal electrode has a predetermined peripheral edge portion extending to a second region which is a predetermined region of a peripheral edge portion of the ceramic layer and which is different from the first region, the ceramic electronic component includes a first external electrode which is in conduction with the first internal electrode at the portion of the first internal electrode which extends to the first region, and the ceramic electronic component includes a second external electrode which is in conduction with the second internal electrode at the portion of the second internal electrode which extends to the second region.

Another ceramic electronic component according to the present disclosure has a structure in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape; and the elliptical first internal electrode has one side end extending to one side end of the elliptical ceramic layer, the elliptical second internal electrode has one side end extending to the other side end of the elliptical ceramic layer, the ceramic electronic component includes a first external electrode which is in conduction with the first internal electrode at the portion of the first internal electrode which extends to the first region, and the ceramic electronic component includes a second external electrode which is in conduction with the second internal electrode at the portion of the second internal electrode which extends to the second region.

A ceramic electronic component according to the present disclosure includes a laminated body in which a first internal electrode and a second internal electrode each having a circular plane shape are arranged so as to face each other with a ceramic layer interposed therebetween, the ceramic layer having a circular plane shape, wherein the first internal electrode is extended to the outside through a first via hole conductor arranged in the laminated body, and the second internal electrode is extended to the outside through a second via hole conductor arranged in the laminated body.

A ceramic electronic component according to the present disclosure includes a laminated body in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape, wherein the first internal electrode is extended to the outside through a first via hole conductor arranged in the laminated body, and the second internal electrode is extended to the outside through a second via hole conductor arranged in the laminated body.

A ceramic electronic component according to the present disclosure has a configuration in which a first internal electrode and a second internal electrode each having a circular plane shape are arranged so as to face each other with a ceramic layer interposed therebetween, the ceramic layer having a circular plane shape; and the first internal electrode has a predetermined peripheral edge portion extending to a first region which is a predetermined region of a peripheral edge portion of the ceramic layer, the second internal electrode has a predetermined peripheral edge portion extending to a second region which is a predetermined region of a peripheral edge portion of the ceramic layer and which is different from the first region, the portion of the first internal electrode which extends to the first region is exposed, and the exposed portion of the first internal electrode serves as a first external electrode, and the portion of the second internal electrode which extends to the second region is exposed, and the exposed portion of the second internal electrode serves as a second external electrode.

A ceramic electronic component according to the present disclosure has a configuration in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape; and the elliptical first internal electrode has one side end extending to a first region which is one side end of the elliptical ceramic layer, the elliptical second internal electrode has one side end extending to a second region which is the other side end of the elliptical ceramic layer, the portion of the first internal electrode which extends to the first region is exposed, and the exposed portion of the first internal electrode serves as a first external electrode, and the portion of the second internal electrode which extends to the second region is exposed, and the exposed portion of the second internal electrode serves as a second external electrode.

In the ceramic electronic component according to the present disclosure, the ceramic electronic component is preferably a layered ceramic electronic component in which a plurality of regions with the first internal electrode and the second internal electrode arranged so as to at least partially face each other with the ceramic layer interposed therebetween exist in the lamination direction.

The present disclosure can also be applied to a layered ceramic electronic component in which a plurality of regions with the first internal electrode and the second internal electrode arranged so as to at least partially face each other with the ceramic layer interposed therebetween exist in the lamination direction, and when the ceramic electronic component is such a layered ceramic electronic component, a small-sized high-performance ceramic electronic component can be provided.

The ceramic electronic component can be configured to include a floating internal electrode which is not in conduction with the first and second external electrodes.

Effects of the Disclosure

A method for producing a ceramic electronic component according to the present disclosure has a configuration as described above, and includes the steps of: forming an uncured ceramic pattern which forms a ceramic layer after firing and has a circular plane shape by applying a ceramic slurry, which contains a ceramic material, to a predetermined location one time or a plurality of times repeatedly using a non-contact-type printing device such as an ink-jet printer; and forming an uncured internal electrode pattern which forms an internal electrode after firing and has a circular plane shape by applying an electrode paste, which contains an internal electrode material, to a predetermined location one time or a plurality of times repeatedly using a non-contact-type printing device such as an ink-jet printer. Thus, a circular ceramic layer and also circular first and second internal electrodes can be efficiently formed without the use of a contact-type printing method using a printing plate, such as screen printing or gravure printing, or of an application method requiring a mask or a resist pattern, and the internal electrode and the ceramic layer can be thinned. Furthermore, a laminating machine for laminating the ceramic layer and the internal electrode is unnecessary, so that the ceramic electronic component can be produced with high productivity.

It is unnecessary to use a so called lamination method in which a thin ceramic green sheet is handled as described above, and handling can be performed in the form of a multilayer chip, leading to excellent handling characteristics.

Another method for producing a ceramic electronic component according to the present disclosure includes the steps of: forming an unfired ceramic pattern which forms an elliptical ceramic layer after firing by applying a ceramic slurry, which contains a ceramic material, to each of locations one time or a plurality of times from one location to another using a non-contact-type printing device such as an ink-jet printer, so that a printing pattern having a circular plane shape is formed with printing patterns at the locations being connected to one another; and forming an unfired internal electrode pattern which forms an elliptical internal electrode after firing by applying an electrode paste, which contains an internal electrode material, to each of locations one time or a plurality of times from one location to another using a non-contact-type printing device such as an ink-jet printer, so that a printing pattern having a circular plane shape is formed with printing patterns at the locations being connected to one another. Thus, an elliptical ceramic layer and also elliptical first and second internal electrodes can be efficiently formed without the use of a contact-type printing method using a printing plate, such as screen printing or gravure printing, or of an application method requiring a mask or a resist pattern, and the internal electrode and the ceramic layer can be thinned.

A laminating machine for laminating the ceramic layer and the internal electrode is unnecessary, so that the ceramic electronic component can be produced with high productivity.

A ceramic electronic component according to the present disclosure has a configuration as described above, and since a ceramic layer and first and second internal electrodes each have a circular plane shape, a chip also has a circular plane shape and has no corner, so that a ceramic electronic component which is hardly chipped and has high reliability can be provided. The ceramic electronic component is not caught and prevented from being conveyed when it is fed by a feeder or the like, and thus the ceramic electronic component is also excellent in handling characteristics.

The above-described circular ceramic layer and first and second internal electrodes are suitable to be formed using a non-contact-type printing device such as an ink-jet printer, and for example, when a printing method using an ink-jet printer is applied, the ceramic layer and first and second internal electrodes can be thinned, and a small-sized ceramic electronic component having a diameter of several tens μm can be efficiently obtained.

Another ceramic electronic component according to the present disclosure has a structure in which a first internal electrode and a second internal electrode each have an elliptical shape, and a ceramic layer also has an elliptical shape; and the ceramic electronic component includes a first external electrode which is in conduction with the first internal electrode at a portion of the first internal electrode which extends to a first region, and the ceramic electronic component includes a second external electrode which is in conduction with the second internal electrode at a portion of the second internal electrode which extends to a second region. A method for forming a ceramic layer and first and second internal electrodes using a non-contact-type printing device such as an ink-jet printer can also applied to a ceramic electronic component having the above-mentioned configuration, and in this case, first and second internal electrodes can be thinned, and a small-sized ceramic electronic component having a width of several tens μm can be efficiently obtained.

By forming the ceramic layer and the internal electrode in an elliptical shape (belt-like shape), a laminated body having large areas of an internal electrode and a dielectric material can be formed, and therefore a multilayer ceramic capacitor, with which a large electrostatic capacity can be secured, can be obtained. Further, a laminated body having large areas of an internal electrode and a piezoelectric material can be formed, and therefore a multilayer piezoelectric body having a large displacement amount can be obtained.

Further, the areas of the internal electrode and the dielectric material can be easily increased, and therefore the thickness can be made smaller as compared to a round multilayer ceramic capacitor or multilayer piezoelectric body having the same capacity.

In the ceramic electronic component according to the present disclosure, it is also possible to extend the internal electrode to the outside through a via hole conductor.

In this case, the degree of freedom for the structure and the production method can be improved, and necessity to expose the first internal electrode and the second internal electrode to the side surface of the laminated body is eliminated, so that humidity resistance can be improved.

In the ceramic electronic component according to the present disclosure, it is also possible to cause the exposed portion of the internal electrode to serve as an external electrode as it is.

BRIEF DESCRIPTION OF THE DRAWINGS

FIG. 1(*b*) is a front sectional view thereof.

FIG. 2(*b*) is a plan view showing an arrangement mode of a second internal electrode.

FIG. 9(*b*) is a front sectional view thereof.

FIG. 26 is a view showing a conventional method for producing a multilayer ceramic capacitor.

DETAILED DESCRIPTION

The features of the present disclosure will described more in detail below by showing embodiments of the present disclosure.

Embodiment 1

Figure 1:
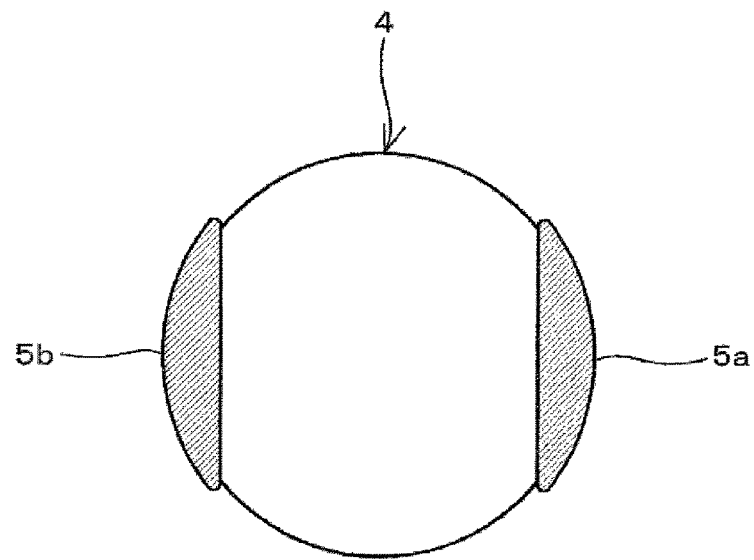
FIG. 1(*a*) is a plan view showing a configuration of a multilayer ceramic capacitor (ceramic electronic component) according to one embodiment (embodiment 1) of the present disclosure.
Figure 1B:
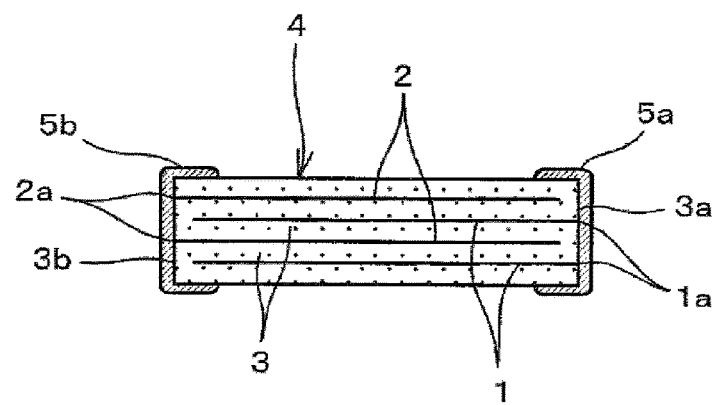
Figure 2:
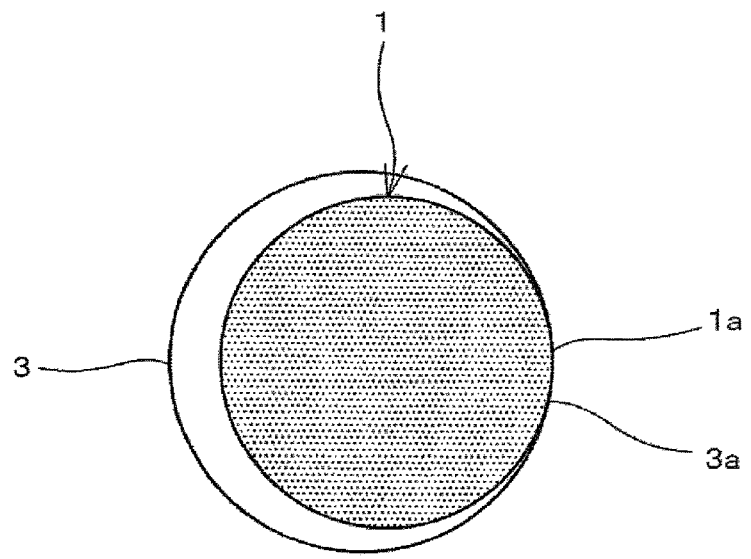
FIG. 2(*a*) is a plan view showing an arrangement mode of a first internal electrode that forms the multilayer ceramic capacitor of embodiment 1.
Figure 2:
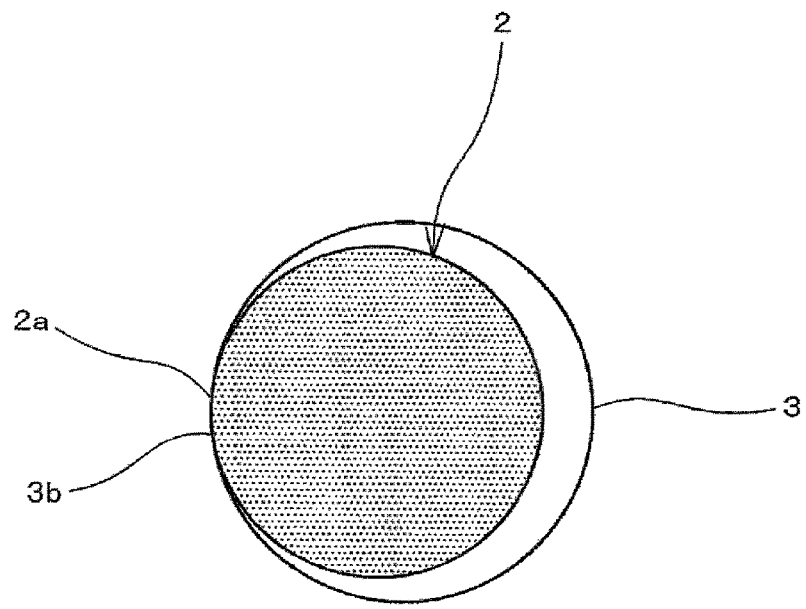

FIG. 1(a) is a plan view showing a configuration of a multilayer ceramic capacitor (ceramic electronic component) according to one embodiment (embodiment 1) of the present disclosure, and FIG. 1(b) is a front sectional view thereof. FIG. 2(a) is a plan view showing an arrangement mode of a first internal electrode that forms the multilayer ceramic capacitor, and FIG. 2(b) is a plan view showing an arrangement mode of a second internal electrode.

The ceramic electronic component of embodiment 1 is a multilayer ceramic capacitor having a circular plane shape as shown in FIGS. 1(a) and 1(b). The multilayer ceramic capacitor includes a laminated body (chip) 4 having a circular plane shape, the laminated body 4 having a structure in which each of a plurality of first internal electrodes 1 and each of a plurality of second internal electrodes 2 are arranged so as to face each other with a ceramic layer 3 interposed therebetween, the ceramic layer 3 having a circular plane shape, and regions of the laminated body 4 which face each other are provided, respectively, with a first external electrode 5a and a second external electrode 5b each arranged so as to extend around to the upper and lower surfaces from the side surface.

The first internal electrode 1 has a predetermined peripheral edge portion 1a extending to a first region 3a which is a predetermined region of a peripheral edge portion of the ceramic layer 3 as shown in FIG. 2(a), and the second internal electrode 2 has a predetermined peripheral edge portion 2a extending to a second region 3b which is a predetermined region of a peripheral edge portion of the ceramic layer 3 as shown in FIG. 2(b).

The first external electrode 5a is arranged so as to be in conduction with the first internal electrode 1 at the portion of the internal electrode 1 which extends to the first region 3a (portion exposed to the outer peripheral surface of the laminated body 4), and the second external electrode 5b is arranged so as to be in conduction with the second internal electrode 2 at the portion of the second internal electrode 2 which extends to the second region 3b.

A method for producing the multilayer ceramic capacitor will now be described.

Figure 3:
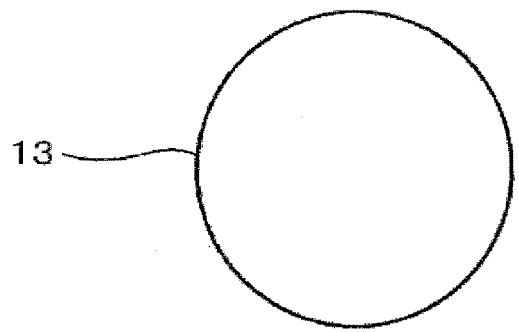
FIG. 3 is a view showing a method for producing the multilayer ceramic capacitor according to embodiment 1 of the present disclosure.

(1) As shown in FIG. 3, a ceramic slurry containing a dielectric ceramic material is applied so as to form a circular pattern corresponding to the shape of the laminated body 4 (FIG. 1) using an ink-jet printer.

Subsequently, the applied ceramic slurry is dried. In this way, an unfired ceramic pattern (ceramic sheet) 13 which forms the ceramic layer 3 after firing and has a circular plane shape is formed.

Figure 4:
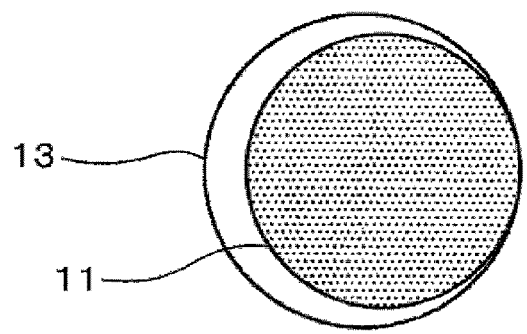
FIG. 4 is a view showing the method for producing the multilayer ceramic capacitor according to embodiment 1 of the present disclosure.

(2) Next, as shown in FIG. 4, an electrode paste containing an internal electrode material is applied onto the circular ceramic pattern 13 so as to form a pattern having a circular plane shape using an ink-jet printer.

The applied electrode paste is dried. In this way, an unfired internal electrode pattern 11 which forms the first internal electrode 1 after firing and has a circular plane shape is formed.

Figure 5:
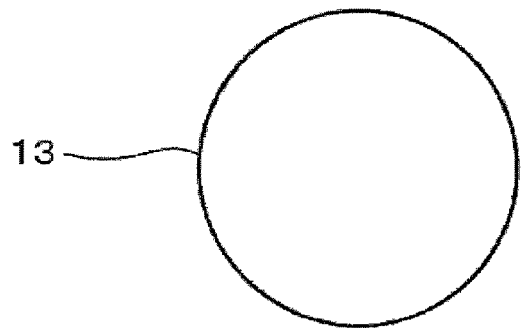
FIG. 5 is a view showing the method for producing the multilayer ceramic capacitor according to embodiment 1 of the present disclosure.

(3) As shown in FIG. 5, a ceramic slurry containing a dielectric ceramic material is applied so as to cover the unfired internal electrode pattern 11 and overlap the first unfired ceramic pattern (ceramic sheet) 13 using an ink-jet printer.

The applied ceramic slurry is dried. In this way, the second unfired ceramic pattern (ceramic sheet) 13 which forms the ceramic layer 3 after firing is formed.

Figure 6:
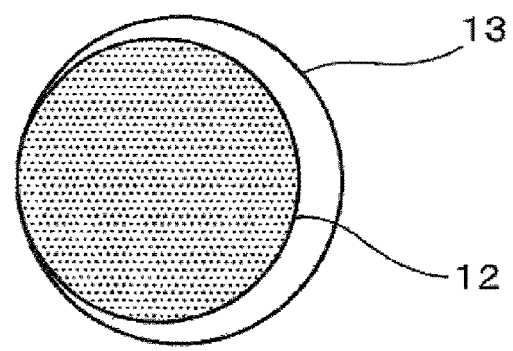
FIG. 6 is a view showing the method for producing the multilayer ceramic capacitor according to embodiment 1 of the present disclosure.

(4) Next, as shown in FIG. 6, an electrode paste containing an internal electrode material is applied onto the ceramic pattern 13, which is formed in the step (3), so as to form a pattern having a circular plane shape using an ink-jet printer.

The applied electrode paste is dried. In this way, an unfired internal electrode pattern 12 which forms the first internal electrode 2 after firing and has a circular plane shape is formed.

Figure 7:
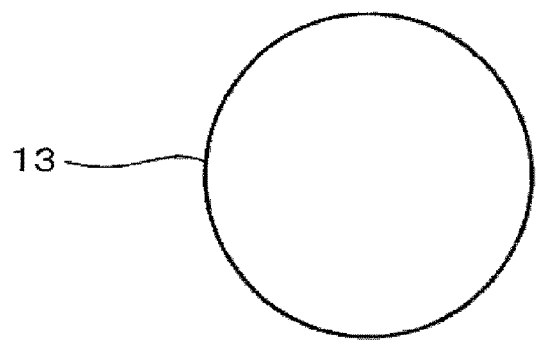
FIG. 7 is a view showing the method for producing the multilayer ceramic capacitor according to embodiment 1 of the present disclosure.

(5) Subsequently, as shown in FIG. 7, a ceramic slurry containing a dielectric ceramic material is applied so as to cover the unfired internal electrode pattern 12 and overlap the second unfired ceramic pattern (ceramic sheet) 13 using an ink-jet printer.

The applied ceramic slurry is dried. In this way, the third unfired ceramic pattern (ceramic sheet) 13 which forms the ceramic layer 3 after firing is formed.

Figure 8:
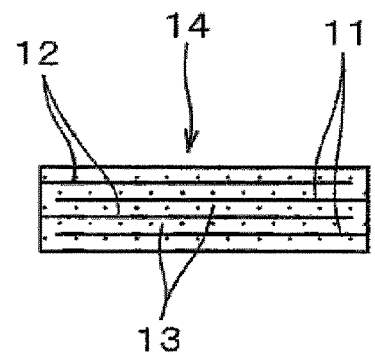
FIG. 8 is a front sectional view showing an unfired laminated body prepared in a process for producing the multilayer ceramic capacitor according to embodiment 1 of the present disclosure.

(6) Thereafter, the steps (2) to (5) are repeated to form an unfired laminated body 14 having a predetermined number of layers (FIG. 8).

(7) Next, the unfired laminated body 14 prepared in the step (6) is fired to obtain the fired laminated body (chip) 4 (see FIG. 1).

(8) Subsequently, the first external electrode 5a and the second external electrode 5b are formed so as to cover a region where the first internal electrode 1 is exposed (first region 3a which is also a predetermined region of the peripheral edge portion of the ceramic layer 3) and a region where the second internal electrode 2 is exposed (second region 3b which is also a predetermined region of the peripheral edge portion of the ceramic layer 3) on the outer peripheral surface of the laminated body (chip) 4 (see FIG. 1).

The first and second external electrodes 5a and 5b can be formed by, for example, applying and baking a conductive paste.

According to the method of embodiment 1, the circular unfired ceramic pattern 13 which forms the ceramic layer 3 after firing is formed by applying a ceramic slurry to a predetermined location using an ink-jet printer, and circular uncured internal electrode patterns 11 and 12 which form the first internal electrode 1 and the second internal electrode 2, respectively, are formed by applying an electrode paste to a predetermined location using an ink-jet printer. Thus, the first and second internal electrodes 1 and 2 and the ceramic layer 3 can be efficiently formed without the use of a contact-type printing method using a printing plate, such as screen printing or gravure printing, or of an application method requiring a mask or a resist pattern, and the first and second internal electrodes 1 and 2 and the ceramic layer 3 can be thinned.

A laminating machine for laminating a ceramic green sheet with a printed internal electrode layer is unnecessary, so that a multilayer ceramic capacitor (ceramic electronic component) can be economically produced with high productivity.

It is unnecessary to use a lamination method in which a thin ceramic green sheet is handled as described above, and handling can be performed in the form of a multilayer chip, so that productivity can be improved in view of handling characteristics.

In embodiment 1, one circular internal electrode pattern or ceramic pattern is formed by applying an ink jet to the same location, but it is also possible to form one internal electrode or one ceramic pattern having a circular plane shape from a macroscopic point of view over a larger area by applying ink jets to different locations.

Embodiment 2

Figure 9A:
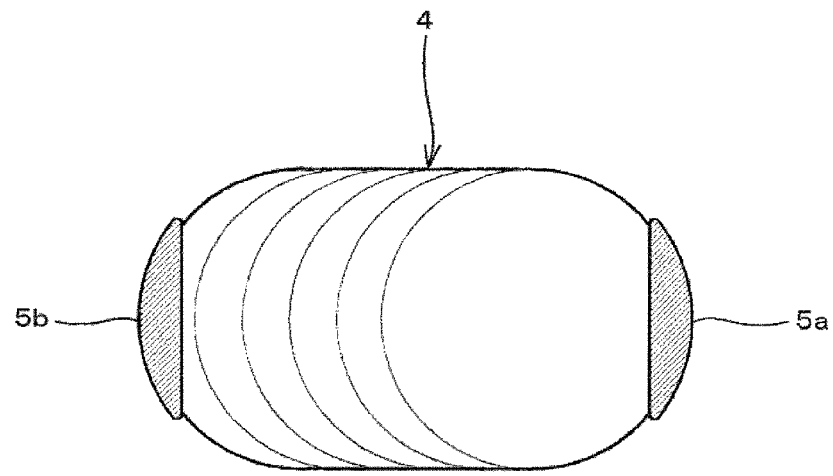
FIG. 9(*a*) is a plan view showing a configuration of a multilayer ceramic capacitor (ceramic electronic component) according to another embodiment (embodiment 2) of the present disclosure.
Figure 9B:
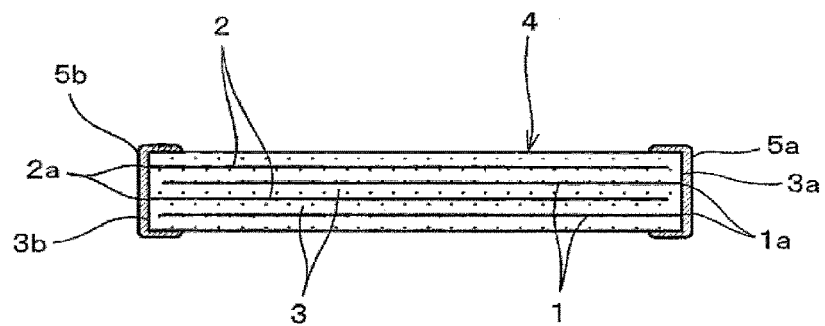
Figure 10A:
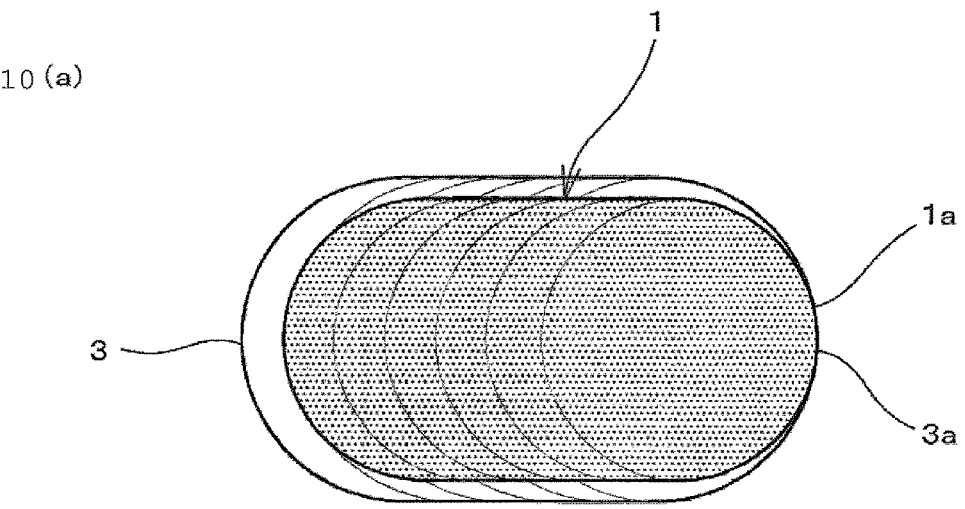
FIG. 10(a) is a plan view showing an arrangement mode of a first internal electrode that forms the multilayer ceramic capacitor of embodiment 2.
Figure 10B:
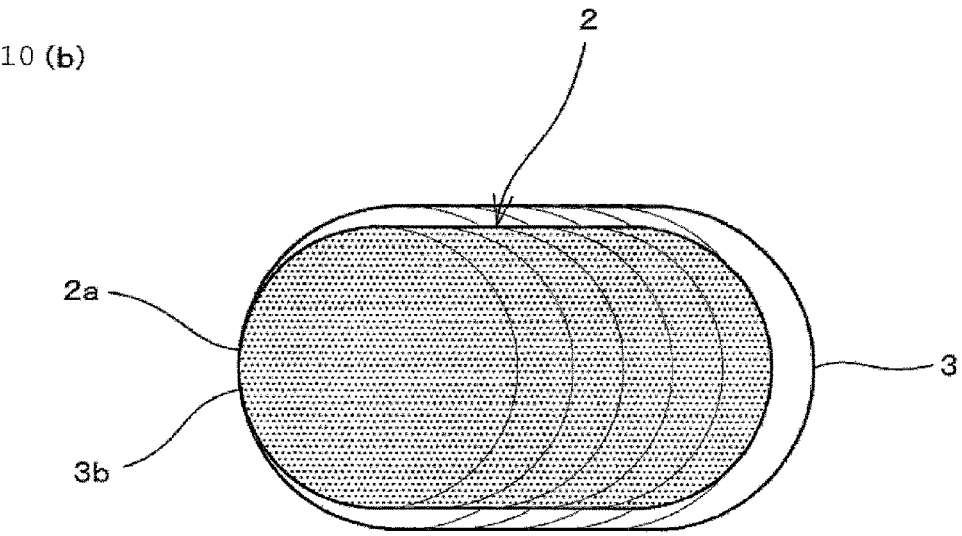
FIG. 10(b) is a plan view showing an arrangement mode of a second internal electrode.

FIG. 9(*a*) is a plan view showing a configuration of a multilayer ceramic capacitor (ceramic electronic component) according to another embodiment (embodiment 2) of the present disclosure, and FIG. 9(*b*) is a front sectional view thereof. FIG. 10(*a*) is a plan view showing an arrangement mode of a first internal electrode that forms the multilayer ceramic capacitor, and FIG. 10(*b*) is a plan view showing an arrangement mode of a second internal electrode.

The ceramic electronic component according to embodiment 2 is a multilayer ceramic capacitor having an elliptical plane shape (belt-like shape with both ends rounded) as shown in FIGS. 9(*a*) and 9(*b*).

The multilayer ceramic capacitor includes a laminated body (chip) 4 having an elliptical plane shape, the laminated body 4 having a structure in which each of a plurality of first internal electrodes 1 and each of a plurality of second internal electrodes 2 each having an elliptical plane shape (belt-like shape) are arranged so as to face each other with a ceramic layer 3 interposed therebetween, the ceramic layer 3 having an elliptical plane shape (belt-like shape), and ends (both ends in the longitudinal direction) of the laminated body (chip) 4 which face each other are provided, respectively, with first and second external electrodes 5a and 5b each arranged so as to extend around to the upper and lower surfaces from the side surface.

The elliptical first internal electrode 1 has one side end (predetermined peripheral edge portion) (first region) 1a extending to a first region 3a which is one side end of the elliptical ceramic layer 3 as shown in FIG. 10(*a*), and similarly, the second internal electrode 2 has one side end (predetermined peripheral edge portion) (second region) 2a extending to a second region 3b which is the other side end of the elliptical ceramic layer 3.

As shown in FIGS. 9(*a*) and 9(*b*), the first external electrode 5a is arranged so as to be in conduction with the first internal electrode 1 at the portion of the internal electrode 1 which extends to the one side end 3a of the ceramic layer 3, and the second external electrode 5b is arranged so as to be in conduction with the second internal electrode 2 at the portion of the second internal electrode 2 which extends to the other side end 3b of the ceramic layer 3.

A method for producing the multilayer ceramic capacitor will now be described.

Figure 11:
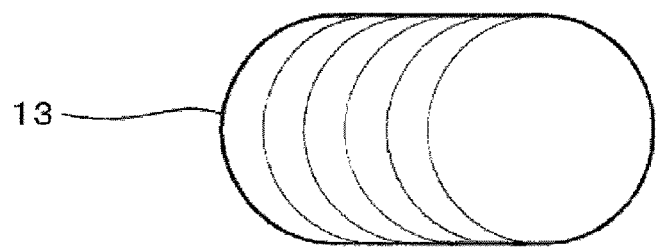
FIG. 11 is a view showing a method for producing the multilayer ceramic capacitor according to embodiment 2 of the present disclosure.

(1) As shown in FIG. 11, a ceramic slurry containing a dielectric ceramic material is applied a plurality of times from one location to another using an ink-jet printer, so that an elliptical (belt-like) printing pattern corresponding to the shape of the laminated body is formed.

Subsequently, the applied ceramic slurry (printing pattern) is dried. In this way, an unfired ceramic pattern (ceramic sheet) 13 which forms the ceramic layer 3 after firing and has an elliptical plane shape is formed.

Figure 12:
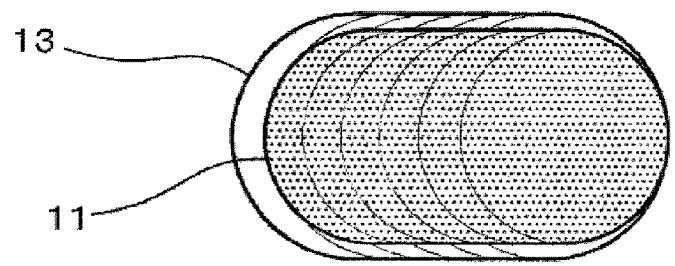
FIG. 12 is a view showing the method for producing the multilayer ceramic capacitor according to embodiment 2 of the present disclosure.

(2) Next, as shown in FIG. 12, an electrode paste containing an internal electrode material is applied onto the circular ceramic pattern 13 a plurality of times from one location to another using an ink-jet printer, so that an elliptical (belt-like) internal electrode pattern is formed.

The applied electrode paste (internal electrode pattern) is dried. In this way, an unfired internal electrode pattern 11 which forms the first internal electrode 1 after firing and has an elliptical (belt-like) plane shape is formed.

Figure 13:
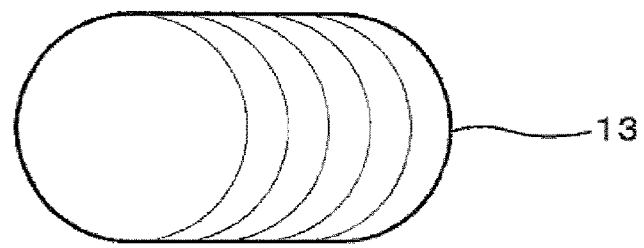
FIG. 13 is a view showing the method for producing the multilayer ceramic capacitor according to embodiment 2 of the present disclosure.

(3) As shown in FIG. 13, a ceramic slurry containing a dielectric ceramic material is applied a plurality of times from one location to another so as to cover the unfired internal electrode pattern 11 and overlap the first unfired ceramic pattern (ceramic sheet) 13 using an ink-jet printer.

The applied ceramic slurry is dried. In this way, the second unfired ceramic pattern (ceramic sheet) 13 which forms the ceramic layer 3 after firing and has an elliptical plane shape is formed.

Figure 14:
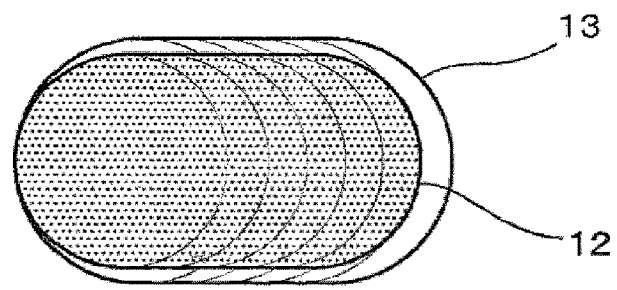
FIG. 14 is a view showing the method for producing the multilayer ceramic capacitor according to embodiment 2 of the present disclosure.

(4) Next, as shown in FIG. 14, an electrode paste containing an internal electrode material is applied onto the ceramic pattern 13, which is formed in the step (3), a plurality of times from one location to another so as to form a pattern having an elliptical plane shape using an ink-jet printer.

The applied electrode paste is dried. In this way, an unfired internal electrode pattern 12 which forms the first internal electrode 2 after firing and has an elliptical plane shape is formed.

Figure 15:
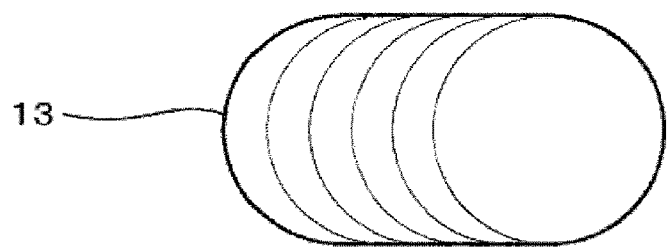
FIG. 15 is a view showing the method for producing the multilayer ceramic capacitor according to embodiment 2 of the present disclosure.

(5) Subsequently, as shown in FIG. 15, a ceramic slurry containing a dielectric ceramic material is applied a plurality of times from one location to another so as to cover the unfired internal electrode pattern 12 and overlap the second unfired ceramic pattern (ceramic sheet) 13 using an ink-jet printer.

The applied ceramic slurry is dried. In this way, the third unfired ceramic pattern (ceramic sheet) 13 which forms the ceramic layer 3 after firing and has an elliptical plane shape is formed.

Figure 16:
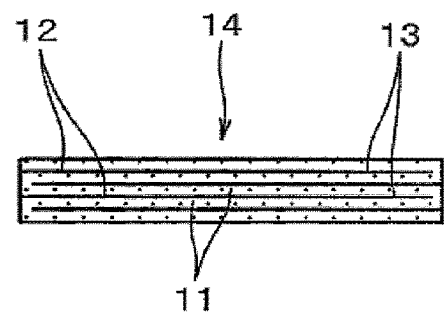
FIG. 16 is a front sectional view showing an unfired laminated body prepared in a process for producing the multilayer ceramic capacitor according to embodiment 2 of the present disclosure.

(6) Thereafter, the steps (2) to (5) are repeated to form an unfired laminated body 14 having a predetermined number of layers (FIG. 16).

(7) Next, the unfired laminated body 14 prepared in the step (6) is fired to obtain the fired laminated body (chip) 4 (see FIG. 9).

(8) Subsequently, the first external electrode 5a and the second external electrode 5b are formed so as to cover a region where the first internal electrode 1 is exposed (first region 3a which is also a predetermined region of the peripheral edge portion of the ceramic layer 3) and a region where the second internal electrode 2 is exposed (second region 3b which is also a predetermined region of the peripheral edge portion of the ceramic layer 3) on the outer peripheral surface of the laminated body (chip) 4 (see FIG. 9).

The first and second external electrodes 5a and 5b can be formed by, for example, applying and baking a conductive paste.

By forming the ceramic layer and the internal electrode in an elliptical shape (belt-like shape) as in the multilayer ceramic capacitor of embodiment 2, a laminated body having a large plane area and having large areas of an internal electrode and a dielectric material can be formed, and therefore a multilayer ceramic capacitor, with which a large electrostatic capacity can be secured, can be obtained.

Further, the areas of the internal electrode and the dielectric material can be easily increased, and therefore the thickness can be made smaller as compared to a round multilayer ceramic capacitor having the same capacity.

In embodiment 2, an elliptical internal electrode pattern or ceramic pattern is formed by applying an electrode paste or ceramic slurry from one location to another so as to form a line using an ink-jet printer, but it is also possible to apply an electrode paste or ceramic slurry so as to form a plurality of lines, so that an elliptical (belt-like) pattern is ultimately formed.

Embodiment 3

Figure 17A:
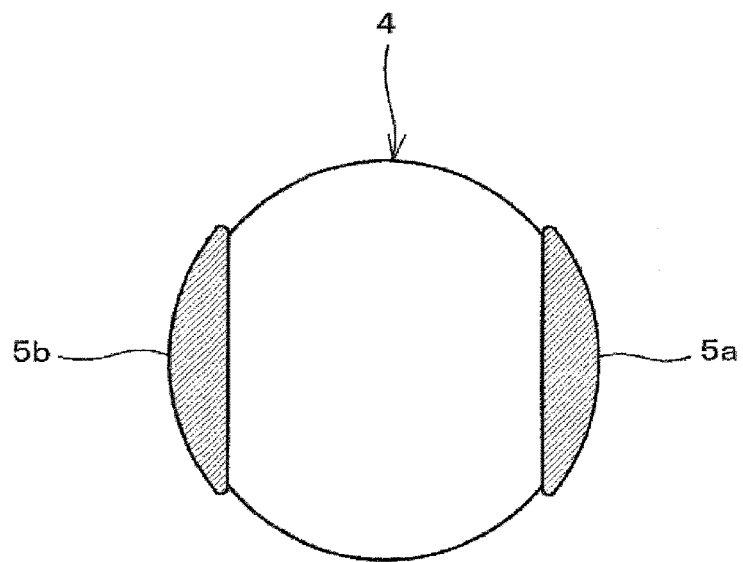
FIG. 17(a) is a plan view showing a configuration of a multilayer ceramic capacitor (ceramic electronic component) according to still another embodiment (embodiment 3) of the present disclosure.
Figure 17B:
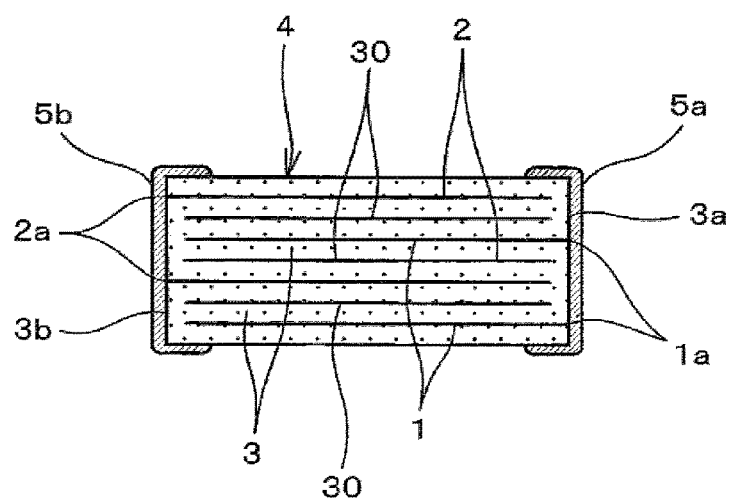
FIG. 17(b) is a front sectional view thereof.
Figure 18:
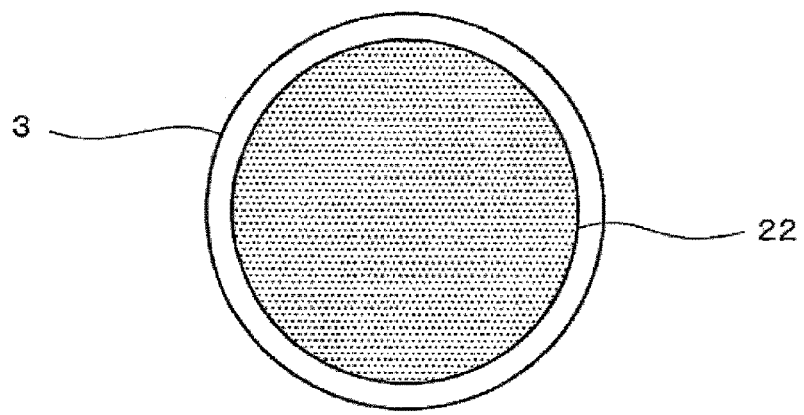
FIG. 18 is a plan view for explaining a method for producing the multilayer ceramic capacitor according to embodiment 3 of the present disclosure.

FIG. 17(a) is a plan view showing a multilayer ceramic capacitor according to still another embodiment of the disclosure of the present application, and FIG. 17(b) is a front sectional view thereof. FIG. 18 is a plan view for explaining a method for producing the ceramic capacitor shown in FIGS. 17(a) and 17(b).

The multilayer ceramic capacitor of embodiment 3 has the same configuration as that of the multilayer ceramic capacitor of embodiment 1 except that the multilayer ceramic capacitor includes a floating internal electrode 30 which is not in conduction with first and second external electrodes 5a and 5b.

This multilayer ceramic capacitor can be produced by a method similar to the method in embodiment 1 except only that in formation of the floating internal electrode 30, an internal electrode paste is applied in such a manner as not to extend to the peripheral edge portion of an unfired ceramic pattern (ceramic sheet) 13, so that an unfired internal electrode pattern 22 for formation of a floating internal electrode is formed (i.e. an unfired internal electrode pattern 22 having a diameter smaller than that of the unfired ceramic pattern is formed) as shown in FIG. 18, to form an internal electrode pattern (floating internal electrode 30) in such a manner that it is not exposed from the side surface of a laminated body 4.

Embodiment 4

Figure 19A:
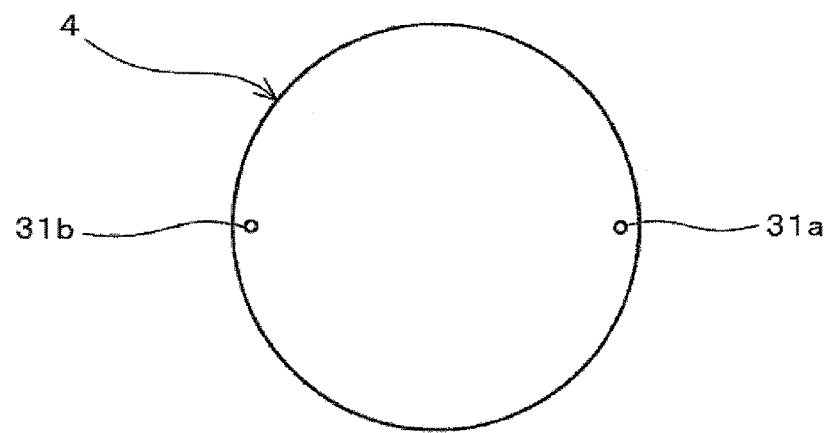
FIG. 19(a) is a plan view showing a configuration of a multilayer ceramic capacitor (ceramic electronic component) according to still another embodiment (embodiment 4) of the present disclosure.
Figure 19B:
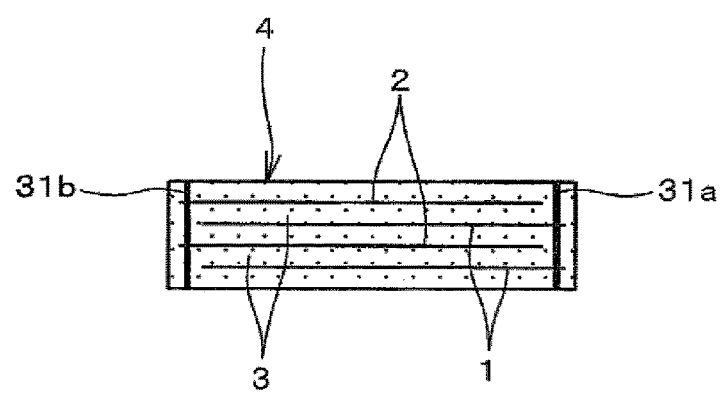
FIG. 19(b) is a front sectional view thereof.

FIG. 19(a) is a plan view showing a multilayer ceramic capacitor according to still another embodiment of the disclosure of the present application, and FIG. 19(b) is a front sectional view thereof.

In this multilayer ceramic capacitor, a first internal electrode 1 and a second internal electrode 2 are not exposed to the side surface of a laminated body 4, and are extended to the outside through a first via hole conductor 31a and second via hole conductors 31a and 31b.

In the case of a multilayer ceramic capacitor having the configuration described above, it is not required to expose the first internal electrode 1 and the second internal electrode 2 to the side surface of the laminated body 4, and therefore humidity resistance can be improved.

When an external electrode is formed so as to be in conduction with the internal electrode exposed to the side surface of the laminated body, the internal electrode exposed when the laminated body is in an unfired state may move backward from the side surface due to sintering shrinkage during firing, leading to insufficient connection to the external electrode, but in the configuration of embodiment 4, such a risk can be reduced.

When the external electrode is formed so as to be in conduction with the internal electrode exposed to the side surface of the laminated body, sufficient conduction reliability can be secured by exposing the internal electrode to the side surface of the laminated body using a method such as barrel polishing, but in the configuration of embodiment 4, the necessity of such an effort can be eliminated.

The first via hole conductor 31a and the second via hole conductor 31b can be formed by, for example, a method in which after formation of the laminated body (chip) 4, a via hole is formed by laser processing, and then filled with a conductor.

In the configuration of embodiment 4, the use amount of an electrode paste for formation of an external electrode can be reduced as compared to embodiments 1 to 3, so that costs can be reduced.

The configuration of embodiment 4 is also advantageous in that when a plating treatment is performed, only the via portion exposed to the surface may be treated, so that the use amount of a plating material can be reduced.

Embodiment 5

Figure 20:
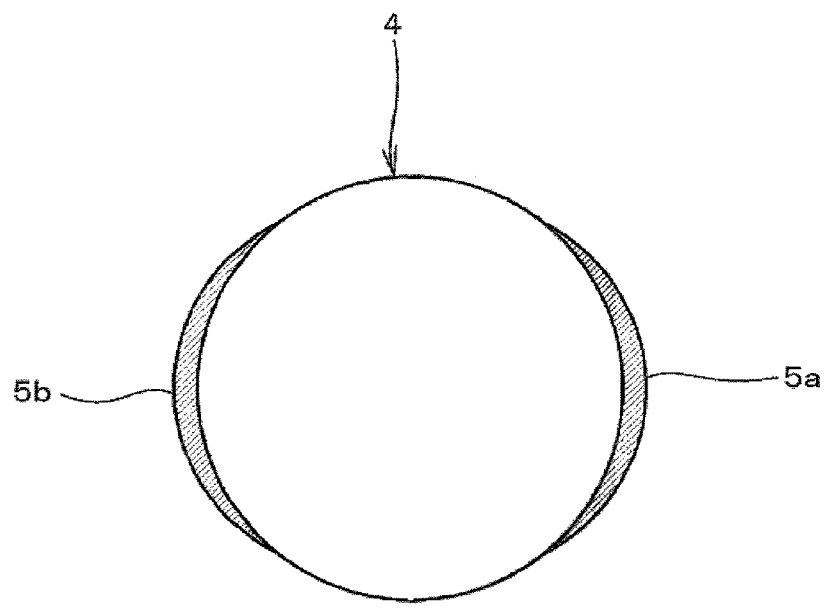
FIG. 20 is a plan view showing a configuration of a multilayer ceramic capacitor (ceramic electronic component) according to still another embodiment (embodiment 5) of the present disclosure.

FIG. 20 is a plan view showing a multilayer ceramic capacitor according to still another embodiment of the disclosure of the present application.

This multilayer ceramic capacitor is configured such that a first internal electrode 1 and a second internal electrode 2 are each protruded at one end on one side from the side surface of the laminated body 4, and the protruded portions serve as first and second external electrodes 5a and 5b.

A method for producing the multilayer ceramic capacitor will now be described.

Figure 21:
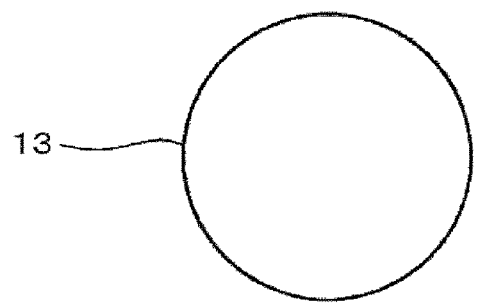
FIG. 21 is a view showing a method for producing the multilayer ceramic capacitor according to embodiment 5 of the present disclosure.

(1) As shown in FIG. 21, a ceramic slurry containing a dielectric ceramic material is applied so as to form a circular pattern corresponding to the shape of the laminated body using an ink-jet printer.

The applied ceramic slurry is dried. In this way, an unfired ceramic pattern (ceramic sheet) 13 which forms the ceramic layer 3 after firing and has a circular plane shape is formed.

Figure 22:
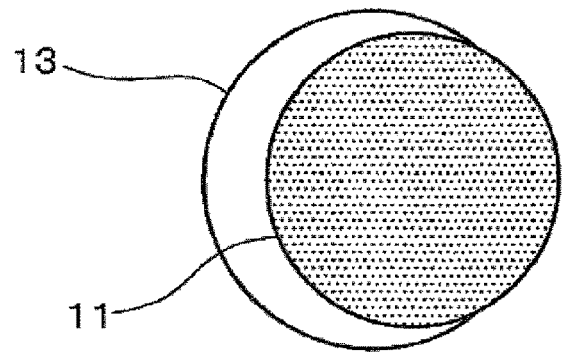
FIG. 22 is a view showing the method for producing the multilayer ceramic capacitor according to embodiment 5 of the present disclosure.

(2) Next, as shown in FIG. 22, an electrode paste containing an internal electrode material is applied in a circular shape onto the circular ceramic pattern 13 in such a manner as to partially protrude from the circular ceramic pattern 13 using an ink-jet printer. Subsequently, the applied electrode paste is dried to form a circular unfired internal electrode pattern 11 in which after firing, the principal part forms the first internal electrode 1 and the protruding part forms a portion that composes the first external electrode 5a.

Figure 23:
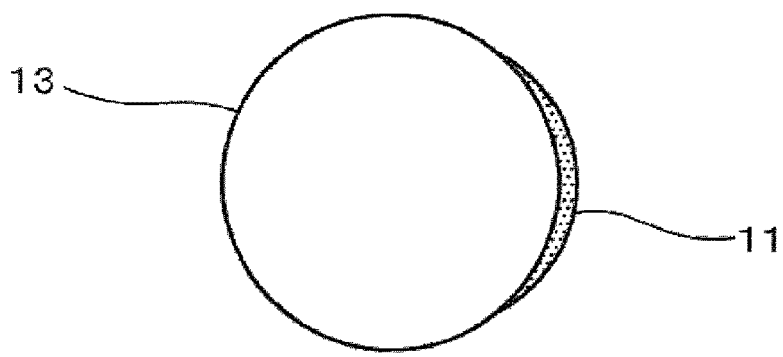
FIG. 23 is a view showing the method for producing the multilayer ceramic capacitor according to embodiment 5 of the present disclosure.

(3) As shown in FIG. 23, a ceramic slurry containing a dielectric ceramic material is applied so as to cover the principal part of the unfired internal electrode pattern 11 and overlap the first unfired ceramic pattern (ceramic sheet) 13 using an ink-jet printer.

The applied ceramic slurry is dried to form the second unfired ceramic pattern (ceramic sheet) 13 that forms the ceramic layer 3 after firing.

Figure 24:
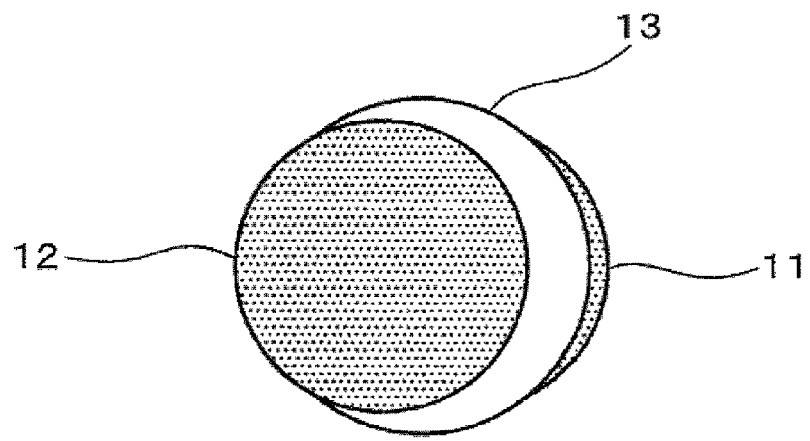
FIG. 24 is a view showing the method for producing the multilayer ceramic capacitor according to embodiment 5 of the present disclosure.

(4) Next, as shown in FIG. 24, an electrode paste containing an internal electrode material is applied in a circular shape onto the ceramic pattern 13, which is formed in the step (3), in such a manner as to partially protrude from the circular ceramic pattern 13 using an ink-jet printer. Subsequently, the applied electrode paste is dried to form a circular unfired internal electrode pattern 12 in which after firing, the principal part forms the second internal electrode 2 and the protruding part forms a portion that composes the second external electrode 5b.

Figure 25:
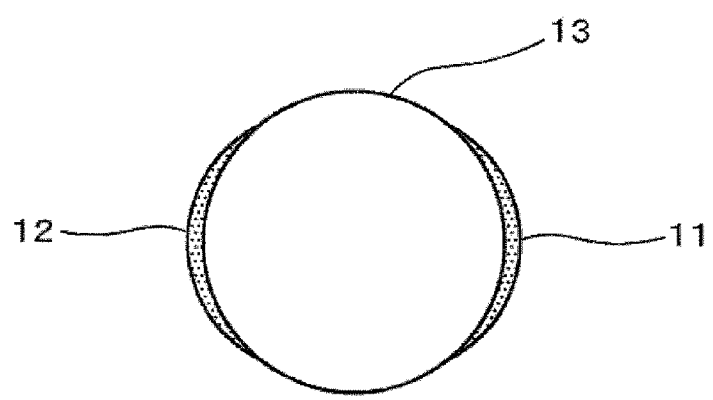
FIG. 25 is a view showing the method for producing the multilayer ceramic capacitor according to embodiment 5 of the present disclosure.

(5) As shown in FIG. 25, a ceramic slurry containing a dielectric ceramic material is applied so as to cover the principal part of the unfired internal electrode pattern 11 and overlap the second unfired ceramic pattern (ceramic sheet) 13 using an ink-jet printer.

The applied ceramic slurry is dried to form the third unfired ceramic pattern (ceramic sheet) 13 that forms the ceramic layer 3 after firing.

The steps (2) to (5) are repeated to form an unfired laminated body having a predetermined number of layers, and the laminated body is fired to obtain a multilayer ceramic capacitor as shown in FIG. 20.

In the case of this multilayer ceramic capacitor, external electrodes can be formed simultaneously from a part of first and second internal electrodes, so that the production process can be simplified. A conductive paste for formation of an external electrode is unnecessary, and therefore costs can be reduced.

The embodiments have been described above taking as an example a multilayer ceramic capacitor as a ceramic electronic component, but the disclosure of the present application is not limited to the multilayer ceramic capacitor, and can be applied to various ceramic electronic components with a ceramic layer and an internal electrode layer arranged so as to be in contact with each other.

In the above embodiments, multilayer ceramic electronic components have been shown, but the disclosure of the present application can also be applied to, for example, single plate capacitors etc.

The present disclosure is not limited to the above embodiments in other respects, and various applications and modifications can be made within the scope of the disclosure.

The invention claimed is:

1. A method for producing a ceramic electronic component which has a structure in which a first internal electrode and a second internal electrode each having a circular plane shape are arranged so as to face each other with a ceramic layer interposed therebetween, the ceramic layer having a circular plane shape;
   the first internal electrode has an arc-shaped predetermined peripheral edge portion of its circular plane shape extending to a first region which is a predetermined region of a peripheral edge portion of the ceramic layer,
   the second internal electrode has an arc-shaped predetermined peripheral edge portion of its circular plane shape extending to a second region which is a predetermined region of a peripheral edge portion of the ceramic layer and which is different from the first region,
   the ceramic electronic component includes a first external electrode having an arc-shape which is in conduction with the first internal electrode at the portion of the first internal electrode which extends to the first region, and
   the ceramic electronic component includes a second external electrode having an arc-shape which is in conduction with the second internal electrode at the portion of the second internal electrode which extends to the second region,
   the method comprising the steps of:
   forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed; and
   forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed.

2. A method for producing a ceramic electronic component which has a structure in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape;

the elliptical first internal electrode has one side end extending to a first region which is one side end of the elliptical ceramic layer, the elliptical second internal electrode has one side end extending to a second region which is the other side end of the elliptical ceramic layer, the ceramic electronic component includes a first external electrode which is in conduction with the first internal electrode at the portion of the first internal electrode which extends to the first region, and the ceramic electronic component includes a second external electrode which is in conduction with the second internal electrode at the portion of the second internal electrode which extends to the second region, the method comprising the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at respective locations being connected to one another; and forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the respective locations being connected to one another.

3. A method for producing a ceramic electronic component including a laminated body which has a structure in which a first internal electrode and a second internal electrode each having a circular plane shape are arranged so as to face each other with a ceramic layer interposed therebetween, the ceramic layer having a circular plane shape; and the first internal electrode is extended to the outside through a first via hole conductor arranged in the laminated body, and the second internal electrode is extended to the outside through a second via hole conductor arranged in the laminated body, wherein the first internal electrode is arranged to be shifted from the second internal electrode, the method comprising the steps of:

forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed;

forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed;

forming in the laminated body a first via hole extending to the first internal electrode and a second via hole extending to the second internal electrode; and filling the first via hole and the second via hole with a conductor, and wherein the ceramic electronic component has a circular plane shape.

4. A method for producing a ceramic electronic component including a laminated body which has a structure in which a first internal electrode each having an elliptical shape with both ends rounded in a substantially semicircular shape and a second internal electrode are arranged so as to face each other with a ceramic layer interposed therebetween, the ceramic layer having an elliptical shape with both ends rounded in a substantially semicircular shape; and the first internal electrode is extended to the outside through a first via hole conductor arranged in the laminated body, and the second internal electrode is extended to the outside through a second via hole conductor arranged in the laminated body, the method comprising the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at respective locations being connected to one another;

forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the respective locations being connected to one another;

forming in the laminated body a first via hole extending to the first internal electrode and a second via hole extending to the second internal electrode; and filling the first via hole and the second via hole with a conductor.

5. A method for producing a ceramic electronic component which has a configuration in which a first internal electrode and a second internal electrode each having a circular plane shape are arranged so as to face each other with a ceramic layer interposed therebetween, the ceramic layer having a circular plane shape;

the first internal electrode has an arc-shaped predetermined peripheral edge portion of its circular plane shape extending to a first region which is a predetermined region of a peripheral edge portion of the ceramic layer, the second internal electrode has an arc-shaped predetermined peripheral edge portion of its circular plane shape extending to a second region which is a predetermined region of a peripheral edge portion of the ceramic layer and which is different from the first region, the portion of the first internal electrode which extends to the first region is exposed and protruded from the ceramic layer, and the exposed and protruding portion of the first internal electrode serves as a first external electrode having an arc-shape, and the portion of the second internal electrode which extends to the second region is exposed and protruded from the ceramic layer, and the exposed and protruding portion of the second internal electrode serves as a second external electrode having an arc-shape, the method comprising the steps of:

forming an unfired ceramic pattern which forms the ceramic layer after firing and which has a circular plane shape by applying a ceramic slurry, which contains a ceramic material, to a predetermined location one time or a plurality of times repeatedly using a printing device which ensures that a discharge portion for discharging the ceramic slurry does not come into contact with an object to be printed; and forming an unfired internal electrode pattern which forms the internal electrode after firing and which has a circular plane shape by applying an electrode paste, which contains an internal electrode material, to a predetermined location one time or a plurality of times repeatedly using a printing device which ensures that a discharge portion for discharging the electrode paste does not come into contact with an object to be printed.

6. A method for producing a ceramic electronic component which has a configuration in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape;

the elliptical first internal electrode has one side end extending to a first region which is one side end of the elliptical ceramic layer, the elliptical second internal electrode has one side end extending to a second region which is the other side end of the elliptical ceramic layer, the portion of the first internal electrode which extends to the first region is exposed, and the exposed portion of the first internal electrode serves as a first external electrode, and the portion of the second internal electrode which extends to the second region is exposed, and the exposed portion of the second internal electrode serves as a second external electrode, the method comprising the steps of:

forming an unfired ceramic pattern which forms the elliptical ceramic layer after firing by applying a ceramic slurry, which contains a ceramic material, to each of locations one time or a plurality of times from one location to another using a printing device which ensures that a discharge portion for discharging the ceramic slurry does not come into contact with an object to be printed, so that a printing pattern having a circular plane shape is formed with printing patterns at respective locations being connected to one another; and forming an unfired internal electrode pattern which forms the elliptical internal electrode after firing by applying an electrode paste, which contains an internal electrode material, to each of locations one time or a plurality of times from one location to another using a printing device which ensures that a discharge portion for discharging the electrode paste does not come into contact with an object to be printed, so that a printing pattern having a circular plane shape is formed with printing patterns at the respective locations being connected to one another.

7. The method for producing the ceramic electronic component according to claim 1, wherein the method includes a step of forming an unfired floating internal electrode pattern which forms a floating internal electrode that is not in conduction with the outside after firing.

8. The method for producing the ceramic electronic component according to claim 1, wherein each of the printing means which applies the ceramic slurry in such a manner that a discharge portion for discharging the ceramic slurry does not come into contact with an object to be printed and the printing device which applies the electrode paste in such a manner that a discharge portion for discharging the electrode paste does not come into contact with an object to be printed is an ink-jet printer.

9. The method for producing the ceramic electronic component according to claim 1, wherein the ceramic electronic component is a layered ceramic electronic component in which a plurality of regions with the first internal electrode and the second internal electrode arranged so as to at least partially face each other with the ceramic layer interposed therebetween exist in a lamination direction.

10. A ceramic electronic component comprising a first internal electrode and a second internal electrode each having a circular plane shape arranged so as to face each other with a ceramic layer interposed therebetween, the ceramic layer having a circular plane shape;

the first internal electrode having an arc-shaped predetermined peripheral edge portion of its circular plane shape extending to a first region which is a predetermined region of a peripheral edge portion of the ceramic layer, the second internal electrode having an arc-shaped predetermined peripheral edge portion of its circular plane shape extending to a second region which is a predetermined region of a peripheral edge portion of the ceramic layer and which is different from the first region, a first external electrode having an arc-shape which is in conduction with the first internal electrode at the portion of the first internal electrode which extends to the first region, and a second external electrode having an arc-shape which is in conduction with the second internal electrode at the portion of the second internal electrode which extends to the second region.

11. The ceramic electronic component according to claim 10, wherein the ceramic electronic component is a layered ceramic electronic component in which a plurality of regions with the first internal electrode and the second internal electrode are arranged so as to at least partially face each other with the ceramic layer interposed therebetween exists in a lamination direction.

12. The ceramic electronic component according to claim 10, wherein the ceramic electronic component further comprising a floating internal electrode that is not in conduction with the outside.

13. A ceramic electronic component comprising a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape;

the elliptical first internal electrode having one side end extending to a first region which is one side end of the elliptical ceramic layer, the elliptical second internal electrode having one side end extending to a second region which is the other side end of the elliptical ceramic layer, a first external electrode which is in conduction with the first internal electrode at the portion of the first internal electrode which extends to the first region, and a second external electrode which is in conduction with the second internal electrode at the portion of the second internal electrode which extends to the second region, wherein radii of the substantially semicircular shapes at opposite ends of the ceramic layer are larger than radii of the substantially semicircular shapes at opposite ends of the first internal electrode, radii of the substantially semicircular shapes at opposite ends of the ceramic layer are larger than radii of the substantially semicircular shapes at opposite ends of the second internal electrode, the radii of the substantially semicircular shapes of the first internal electrode at opposite ends are the same, and the radii of the substantially semicircular shapes of the second internal electrode at opposite ends are the same.

14. A ceramic electronic component comprising
a laminated body in which a first internal electrode and a second internal electrode each having a circular plane shape are arranged so as to face each other with a ceramic layer interposed therebetween, the ceramic layer having a circular plane shape, wherein the first internal electrode is extended to the outside through a first via hole conductor arranged in the laminated body, and the second internal electrode is extended to the outside through a second via hole conductor arranged in the laminated body, wherein the first internal electrode is arranged to be shifted from the second internal electrode, and wherein the ceramic electronic component has a circular plane shape.

15. A ceramic electronic component comprising
a laminated body in which a first internal electrode and a second internal electrode each having an elliptical shape with both ends rounded in a substantially semicircular shape are arranged so as to face each other with a ceramic layer interposed therebetween, the ceramic layer having an elliptical shape with both ends rounded in a substantially semicircular shape, wherein the first internal electrode is extended to the outside through a first via hole conductor arranged in the laminated body, the second internal electrode is extended to the outside through a second via hole conductor arranged in the laminated body, wherein radii of the substantially semicircular shapes at opposite ends of the ceramic layer are larger than radii of the substantially semicircular shapes at opposite ends of the first internal electrode, and radii of the substantially semicircular shapes at opposite ends of the ceramic layer are larger than radii of the substantially semicircular shapes at opposite ends of the second internal electrode, the radii of the substantially semicircular shapes of the first internal electrode at opposite ends are the same, and the radii of the substantially semicircular shapes of the second internal electrode at opposite ends are the same.

16. A ceramic electronic component comprising
a first internal electrode and a second internal electrode each having a circular plane shape arranged so as to face each other with a ceramic layer interposed therebetween, the ceramic layer having a circular plane shape;

the first internal electrode having an arc-shaped predetermined peripheral edge portion of its circular plane shape extending to a first region which is a predetermined region of a peripheral edge portion of the ceramic layer, the second internal electrode having an arc-shaped predetermined peripheral edge portion of its circular plane shape extending to a second region which is a predetermined region of a peripheral edge portion of the ceramic layer and which is different from the first region, a portion of the first internal electrode which extends to the first region is exposed and protruded from the ceramic layer, and the exposed and protruding portion of the first internal electrode serves as a first external electrode having an arc-shape, and a portion of the second internal electrode which extends to the second region is exposed and protruded from the ceramic layer, and the exposed and protruding portion of the second internal electrode serves as a second external electrode having an arc-shape.

17. A ceramic electronic component comprising
a first internal electrode and a second internal electrode each having an elliptical shape with both ends rounded in a substantially semicircular shape arranged so as to face each other with a ceramic layer interposed therebetween, the ceramic layer having an elliptical shape with both ends rounded in a substantially semicircular shape; wherein the elliptical first internal electrode has one side end extending to a first region which is one side end of the elliptical ceramic layer, the elliptical second internal electrode has one side end extending to a second region which is the other side end of the elliptical ceramic layer, a portion of the first internal electrode which extends to the first region is exposed and protruded from the ceramic layer, and the exposed and protruding portion of the first internal electrode serves as a first external electrode having an arc-shape, a portion of the second internal electrode which extends to the second region is exposed and protruded from the ceramic layer, and the exposed and protruding portion of the second internal electrode serves as a second external electrode having an arc-shape, radii of the substantially semicircular shapes at opposite ends of the ceramic layer are larger than radii of the substantially semicircular shapes at opposite ends of the first internal electrode, and radii of the substantially semicircular shapes at opposite ends of the ceramic layer are larger than radii of the substantially semicircular shapes at opposite ends of the second internal electrode.

* * * * *